Sept. 20, 1966             I. J. STANCHEL            3,273,873
APPARATUS FOR DRY HEAT PRE-EXPANSION OF EXPANDABLE
POLYSTYRENE AND LIKE PRODUCTS
Filed Nov. 13, 1962                             2 Sheets-Sheet 1
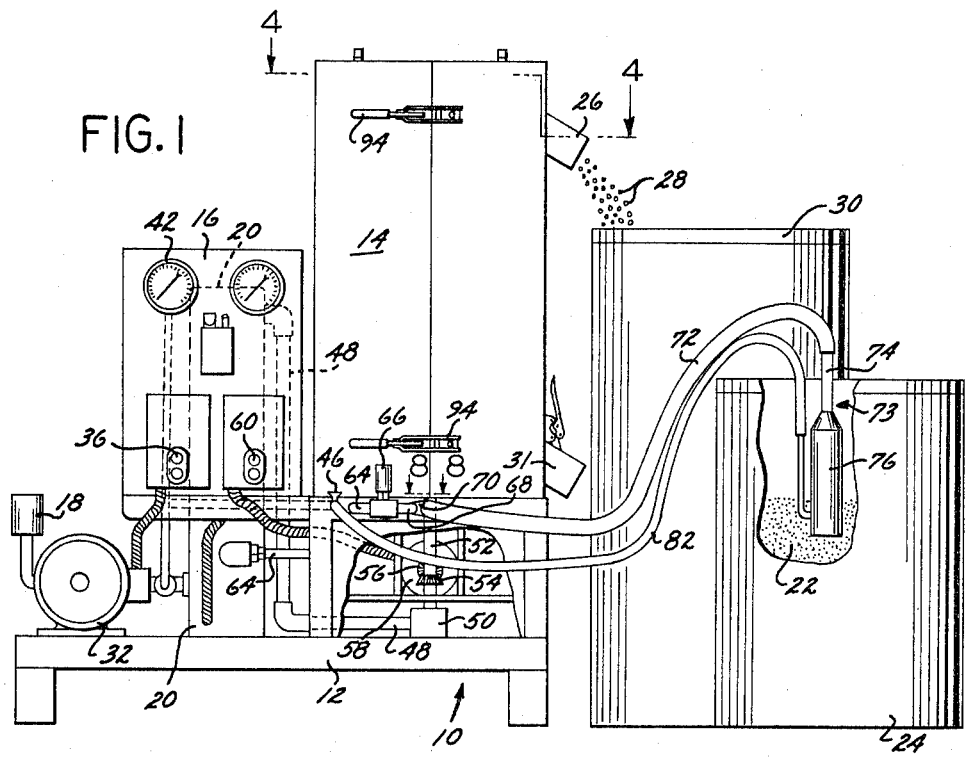
INVENTOR.
IVAN J. STANCHEL
BY R. E. Giauque
ATTORNEY Sept. 20, 1966  I. J. STANCHEL  3,273,873
APPARATUS FOR DRY HEAT PRE-EXPANSION OF EXPANDABLE
POLYSTYRENE AND LIKE PRODUCTS
Filed Nov. 13, 1962  2 Sheets-Sheet 2
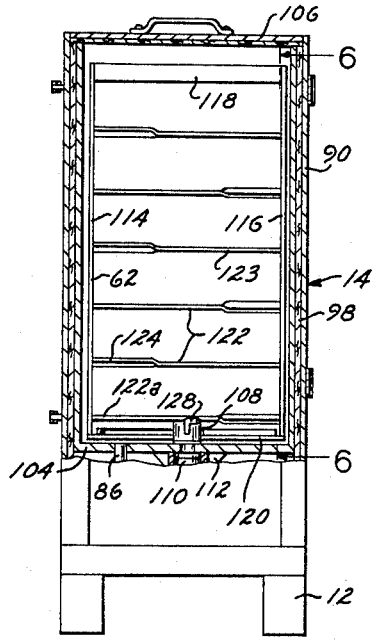
FIG. 5
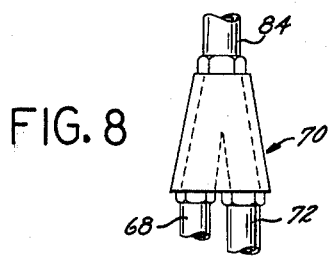
FIG. 8
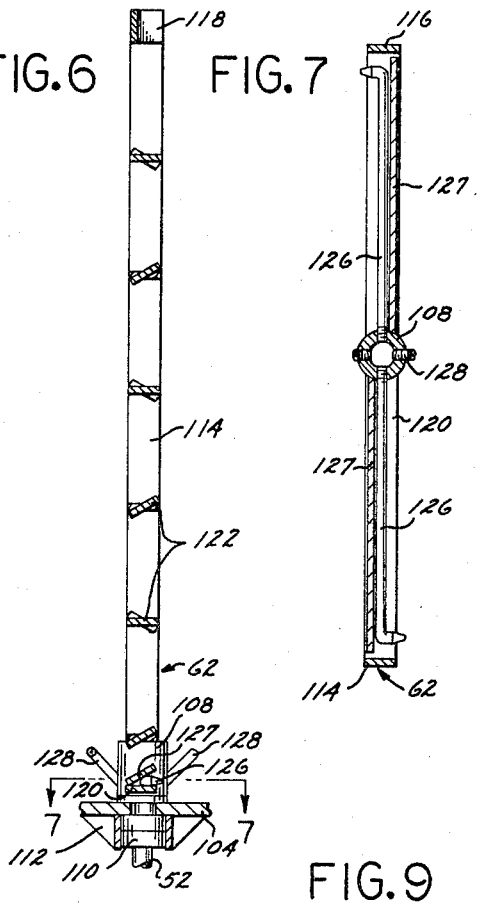
FIG. 6  FIG. 7
FIG. 9
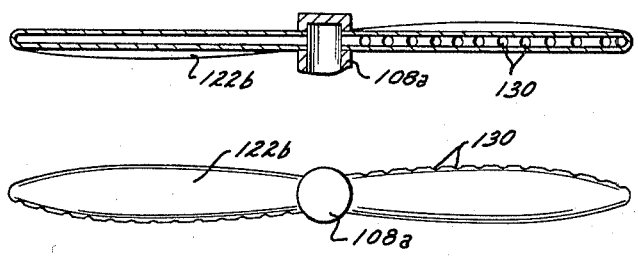
FIG. 11
FIG. 10
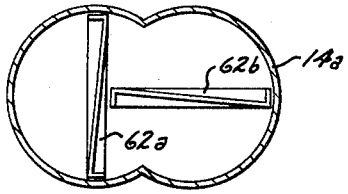
INVENTOR.
IVAN J. STANCHEL
BY R. E. Geangue
ATTORNEY United States Patent Office
3,273,873
Patented Sept. 20, 1966

3,273,873
APPARATUS FOR DRY HEAT PRE-EXPANSION OF EXPANDABLE POLYSTYRENE AND LIKE PRODUCTS
Ivan J. Stanchel, 10740 Cumpston St., North Hollywood, Calif.
Filed Nov. 13, 1962, Ser. No. 237,081
3 Claims. (Cl. 263—26)

This invention relates to an apparatus for pre-expanding expandable polystyrene and like products and more particularly to an apparatus employing dry heat to pre-expand polystyrene beads.

In the molding industry, lightweight products are molded from a material which is obtained by expanding small beads or pellets of polystyrene until they expand into puffed beads or pellets. Each bead should be expanded uniformly on all surfaces to prevent a difference in density and surface texture in the expanded product; however, uniform expansion has been virtually impossible to obtain with prior art methods.

In one prior art method, steam is employed to expand the beads and, although generally satisfactory, it does have certain drawbacks. One drawback resides in the fact that the expanded product must be cured to remove its moisture content before it can be molded. Also, the moisture employed encourages the lumping together of the expanded product and, when colored beads are employed, the moisture tends to wash some of the color out of the expanded product.

In addition, the apparatus employed with the steam expansion process conventionally introduces steam through the side wall of the apparatus which results in hot spots on the side wall causing the product being expanded to lump together in the vicinity of the hot spots.

An additional problem is encountered in connection with pre-expanders of the prior art in that it has been extremely difficult to clean the apparatus after use.

A still further problem resides in the difficulty of molding a finished product having a smooth surface texture with a minimum of pits and pock marks when expanding the beads in accordance with prior art teachings.

In view of the foregoing factors and conditions characteristic of apparatus for and methods of pre-expanding expandable polystyrene beads, it is a primary object of the present invention to provide a new and improved apparatus for expanding said beads which is not subject to the disadvantages enumerated above and which employs dry heat to uniformly expand the beads while eliminating lumping of the expanded product.

Another object of the invention is to provide an apparatus for pre-expanding polystyrene beads, such apparatus having a split housing which may be opened so that the interior thereof may be readily cleaned.

Yet another object of the invention is to provide apparatus for pre-expanding polystyrene beads which eliminates hot spots in the drum, which has an improved agitator design imparting a uniform, controlled rise rate to the expanded product and which employs a unique inlet for the expanding medium.

A further object of the invention is to provide a dry-heat means of expanding polystyrene beads which reduces molding cycles, eliminates pre-puff curing time, minimizes lumping of the puffed product, produces an expanded product of uniform surface texture and color and which may be operated on a continuous basis.

A still further object of the present invention is to provide an apparatus for expanding polystyrene beads which admits the product to be expanded at a point subjacent the agitator.

Another object of the present invention is to provide an apparatus for pre-expanding polystyrene beads wherein pre-heated air is introduced into the apparatus in such a manner that the air cooperates with the agitator to impart a uniform rise rate to the beads.

According to the present invention, a dry-heat pre-expander is provided with an insulated, split housing having an agitator rotatably mounted therein. The agitator is mounted on a rotatable air shaft which not only rotates the agitator, but which also serves as the inlet for hot air employed in the dry heat expansion process. A discharge chute is provided near the top of the housing so that the expanded product will automatically flow from the apparatus thereby permitting operation on a continuous basis. Pre-heated air is also employed in an aspirator which draws the beads into the apparatus, and the product to be expanded is introduced into the bottom of the apparatus so that the beads will not be forced against the sidewall of the housing by the agitator. The agitator and the hot air employed to expand the product cooperate to raise the beads from the bottom to the top of the apparatus in such a manner that all portions of the surfaces of the beads are uniformly exposed to the expanding medium.

The teachings of the present invention, which are believed to be novel, are set forth with particularity in the appended claims. The present invention, both as to its organization and manner of operation, together with further objects and advantages thereof, may best be understood by reference to the following description, taken in connection with the accompanying drawings in which:

FIGURE 1 is an elevational view of a presently preferred embodiment of the invention shown in its operating environment;

FIGURE 2 is a plan view of the apparatus of FIGURE 1;

FIGURE 3 is a cross-sectional view, on an enlarged scale, of part of the feeding mechanism of FIGURE 1;

FIGURE 4 is a transverse, cross-sectional view taken along line 4—4 of FIGURE 1;

FIGURE 5 is a vertical sectional view, partly in elevation, taken along line 5—5 of FIGURE 4;

FIGURE 6 is a cross-sectional view taken along line 6—6 of FIGURE 5;

FIGURE 7 is a cross-sectional view of the agitator of FIGURE 1 taken along line 7—7 of FIGURE 6;

FIGURE 8 is an elevational view of an aspirator used with the apparatus of the invention taken in the direction of arrows 8—8 of FIGURE 1;

FIGURE 9 is a cross-sectional view of a modified agitator blade which may be employed with the apparatus of FIGURE 1;

FIGURE 10 is a plan view of the blade of FIGURE 9; and

FIGURE 11 is a transverse, cross-sectional view showing somewhat schematically a modified apparatus employing two agitators in place of the single agitator employed in the embodiment of FIGURE 1.

Referring again to the drawings and particularly to FIGURES 1–8, the device constituting the apparatus of the present invention, generally designated 10, includes a floor stand 12 upon which is mounted a pre-expander 14, a control panel 16, an air compressor 18 and an air heater 20. Polystyrene beads 22, which are to be expanded by the pre-expander 14, may be stored in a drum 24 alongside the floor stand 12 and are supplied to the pre-expander 14 through apparatus to be hereinafter described. The beads 22 are uniformly expanded inside the pre-expander 14 while rising upwardly therein and are discharged out a discharge chute 26 in the form of puffed beads or pellets 28 into a suitable container 30. A normally closed cleanout chute 31 is provided at the bottom of the pre-expander 14.

An electric motor 32 drives the air compressor 18 through a shaft 34 and is activated by means of a switch 36 on control panel 16. Air is discharged from the air compressor 18 at approximately 200° F. through a main line 38 into the heater 20. A first branch line 40 carries air from the main line 38 to a pressure gage 42 mounted on panel 16. A second branch line 44 carries air from the first branch line 40 to a normally closed valve 46. The heater 20 heats the air supplied by compressor 18 to approximately 700° F. after which the air is conveyed through a conduit 48 to a universal joint 50. A rotatable conduit 52 is rotatably mounted in the universal joint 50 and has a bevelled gear 54 rigidly connected thereto. The gear 54 engages a similar gear 56 on a motor 58 which is activated by a switch 60 mounted on panel 16. The rotatable conduit 52 serves the dual functions of driving an agitator 62 (FIGURE 4) and of supplying dry heat to the interior of the pre-expander 14. Air is conveyed by a line 64 from the heater 20 to a pressure regulating valve 66 from which the air flows through a pipe 68 into an aspirator 70 (FIGURE 8). The suction side of the aspirator 70 is in fluid communication with the beads 22 through a flexible conduit 72 and a pick-up mechanism 73 which includes a pipe 74 encased in a cylindrical housing 76 having an open bottom 78 and a closed top 80 (FIGURE 3). A conduit 82 places the housing 76 in fluid communication with the air compressor 18 through the normally closed valve 46, branch lines 40 and 44 and main line 38. When the valve 46 is opened, air which has been pre-heated by the air compressor is admitted to the housing 76 so that the beads 22 will be pre-heated as they leave the container 24. The beads 22 are drawn upwardly through the pipe 74, and flow through conduit 72 into the aspirator 70 from which they are discharged into the pre-expander 14 through an inlet pipe 84 and a material inlet port 86. As will become more fully apparent hereinafter, it is an important feature of the invention that the material inlet port 86 be mounted in the bottom of the pre-expander 14, as distinguished from the side wall thereof, so that the beads 22 will not be wedged against the sidewall by the agitator 62.

The pre-expander 14 includes an outer casing 90 which is split vertically into two halves joined together by means of suitable hinges, one of which is shown at 92. The two halves are closed by means of latches 94. An upstanding, open-topped, cylindrical housing member 96 is mounted in the casing 90 in spaced relation therewith and is insulated therefrom by means of insulation 98. The open-topped housing member 96 includes an encompassing sidewall which is split lengthwise to form a first member 100 and a second member 102. The member 100 is rigidly affixed to an annular bottom wall 104 while the second member 102 is free to swing relative thereto. The members 100 and 102 are each rigidly affixed to a respective half of the casing 90 in such a manner that the member 102 will swing about an axis defined by the hinges 92 when the latches 94 are released. The casing 90 and housing member 96 may be closed at the top by means of a hinged lid 106.

The agitator 62 is rotatably mounted within the housing member 96 by means of an air distribution manifold 108 which rigidly connects the agitator 62 to the rotatable conduit 52. A bushing 110 (FIGURE 6) is rigidly affixed to the rotatable conduit 52 and is journalled in a journal 112 which is rigidly affixed to the underside of the bottom wall 104.

While various types of agitators will manifest themselves, the one shown for purposes of illustration, but not of limitation, includes a rectangular frame having upstanding members 114 and 116, respectively, an upper member 118 and a lower member 120. A plurality of blades 122 are horizontally mounted in the frame in vertically spaced relation and have their ends rigidly connected to the upstanding members 114 and 116. Each blade 122 has a straight portion 123 and a twisted portion 124. The twisted portions 124 extend over approximately one-third of the length of the blades 122 and are arranged in staggered relation vertically in such a manner that a twisted portion 124 is adjacent the upstanding member 114 for a particular blade 122 and adjacent the upright member 116 for the next respective higher or lower blade 122. The upper member 118 is Z-shaped, as shown in FIGURE 4, so that, when the agitator 62 rotates in a clockwise direction, as viewed in FIGURE 4, the puffed pellets 28 will be expelled from the pre-expander 14 through the discharge chute 26 which is located at approximately the same elevation as the member 118.

A first pair of air discharge nozzles 126 are connected to the manifold 108 and are supported on the upper side of the lower member 120. A plate 127 has an edge attached to the lower member 120 and slopes upwardly over each nozzle 126 to present a streamlined surface to the material being treated. A second pair of air discharge nozzles 128 are connected to the manifold 108 substantially at right angles to the first pair of nozzles 126 and extend upwardly to an elevation adjacent the lower blade 122a. All of the nozzles are arranged to discharge in a direction trailing their direction of rotation so that puffed beads will not clog them. The nozzles 126 and 128 serve the functions of (1) admitting preheated air from the heater 20 to the pre-expander 14 to maintain a dry-heat zone therein, (2) suspending the beads 22 entering the pre-expander 14 through inlet 86 and (3) treating the suspended beads 22 with dry heat to expand them. The agitator 62 cooperates with the nozzles 126 and 128 to control the rise rate of the beads 22 in such a manner that all surfaces thereof will be uniformly treated with the dry heat existing within the pre-expander 14 by the time the agitator elevates the beads to the discharge chute 26.

Referring now to FIGURES 9 and 10, a modified agitator blade 122b is shown which is hollow and is in fluid communication with an air inlet manifold 108a. The blade 122b includes air discharge orifices 130 along its trailing edges to eliminate the need for separate air discharge nozzles.

Referring now to FIGURE 11, a modified pre-expander 14a is shown which is identical to the pre-expander 14 except that it has two agitators 62a and 62b, respectively, which may be arranged for rotation in such a manner that the leading edge of one agitator sweeps through the approximate center of rotation of the other agitator to eliminate cavitation.

It is an important feature of the invention that the individual beads 22 be maintained in suspension and out of substantial contact with each other within the pre-expander 14 so that all surfaces of each bead may be contacted with the dry heat existing within the apparatus both before and after expansion so that the flakes 28 will be uniformly expanded and will not lump together.

Operation of the device will be readily understood. The electric motor 32 is energized to drive the air compressor 18 which discharges compressed air at approximately 200° F. through conduit 38 into the heater 20 where the air is heated to approximately 700° F. Heated air from the heater 20 flows through conduit 48, universal joint 50, rotatable pipe 52, manifold 108 and air discharge nozzles 126 and 128 into the cylindrical housing member 96 establishing a dry-heat zone therein. The motor 58 is then energized to rotate the agitator 62 and the air discharge nozzles 126 and 128. Air from the heater 20 is admitted to aspirator 70 through line 64, pressure regulator 66 and pipe 68. Simultaneously, valve 46 is opened to admit 200° F. air from the air compressor 18 to the pick-up mechanism 73 through main line 38, branch lines 40 and 44, valve 46 and conduit 82 to pre-heat beads 22. The aspirator 70 draws pre-heated beads 22 from the container 24 up through pipe 74 and conduit 72 and discharges them into the housing member 96 through inlet pipe 84 and material inlet port 86. The beads 22 entering housing member 96 are picked up in the air stream issuing from nozzles 126 and 128 and are moved progressively upwardly through the dry-heat zone existing in member 96 at a predetermined rise rate by means of the agitator 62. Fully expanded beads 28 are discharged through the discharge chute 26 into the storage container 30.

It has been found that the agitator 62 may be operated at between 100 and 200 r.p.m. to satisfactorily control the rise rate of the beads 22 in such a manner that they will be uniformly expanded into puffed pellets 28 before they reach the discharge chute 26.

While the particular apparatus for and method of pre-expanding expandable polystyrene beads herein shown and described in detail are fully capable of attaining the objects and providing the advantages hereinbefore stated, it is to be understood that they are merely illustrative of the presently preferred embodiments of the invention and that no limitations are intended to the details of construction, design or operational steps herein shown and described other than as defined in the appended claims.

What is claimed is:

1. Apparatus for expanding polystyrene beads comprising: a housing in which said beads are expanded, said housing having an encompassing sidewall, a closed top and a closed bottom wall; an outlet port in said housing adjacent its top through which the expanded beads are discharged; an inlet port in said bottom wall through which unexpanded beads enter said housing; air distribution means located in said housing for establishing a dry-heat zone therein and for suspending said beads within said housing; an agitator rotatably mounted in said housing superjacent said material inlet port for moving said beads in suspended condition through said dry-heat zone to said outlet port; means for rotating said agitator, said air distribution means connected to said agitator adjacent the lower end thereof for rotation therewith and directing pre-heated moisture free air into unexpanded beads entering said housing, a second supply of pre-heated air, and an aspirator connecting said inlet port and said second air supply to a supply of unexpanded beads for drawing said beads into said housing.

2. The apparatus of claim 1 including a third supply of pre-heated air connected to said supply of unexpanded beads for pre-heating said beads as they are drawn into said housing.

3. The apparatus of claim 1 including a second agitator rotatably mounted in said housing, said agitators being arranged in such a manner that the leading edge of one sweeps through the approximate center of rotation of the other.

References Cited by the Examiner

UNITED STATES PATENTS

| 1,992,208 | 2/1935 | Harrison | 259—147 |
| 2,542,031 | 2/1951 | Humfeld et al. | 259—151 X |
| 2,615,702 | 10/1952 | Allert | 263—11 |
| 2,696,677 | 12/1954 | Molenaar | 34—57 |
| 2,787,809 | 4/1957 | Stastny | 18—48 |
| 2,911,730 | 11/1959 | Schaub et al. | 34—57 |
| 2,944,292 | 7/1960 | Norrhede | 18—48 |
| 3,023,175 | 2/1962 | Rodman | 18—48 |
| 3,139,272 | 6/1964 | Couchman | 263—21 |
| 3,165,303 | 1/1965 | Paulson | 263—21 |

FOREIGN PATENTS 1,254,410  1/1961  France.

OTHER REFERENCES

Webster's Third New International Dictionary, G. and C. Merriam Company, Springfield, Massachusetts, 1963.

FREDERICK L. MATTESON, Jr., *Primary Examiner.*

NORMAN YUDKOFF, WILLIAM F. O'DEA,
*Examiners.*

F. E. DRUMMOND, D. A. TAMBURRO,
*Assistant Examiners.*